(12) United States Patent
Blanco et al.

(10) Patent No.: US 9,367,633 B2
(45) Date of Patent: Jun. 14, 2016

(54) METHOD OR SYSTEM FOR RANKING RELATED NEWS PREDICTIONS

(75) Inventors: Roi Blanco, Barcelona (ES); Michael Patrick Matthews, New York, NY (US); Peter Mika, Barcelona (ES)

(73) Assignee: Yahoo! Inc., Sunnyvale, CA (US)

( * ) Notice: Subject to any disclaimer, the term of this patent is extended or adjusted under 35 U.S.C. 154(b) by 452 days.

(21) Appl. No.: 13/538,798

(22) Filed: Jun. 29, 2012

(65) Prior Publication Data

US 2014/0006328 A1 Jan. 2, 2014

(51) Int. Cl.
*G06F 17/30* (2006.01)
(52) U.S. Cl.
CPC ...... *G06F 17/3087* (2013.01); *G06F 17/30861* (2013.01); *G06F 17/30864* (2013.01)
(58) Field of Classification Search
None
See application file for complete search history.

(56) References Cited

U.S. PATENT DOCUMENTS

| | | | | |
|---|---|---|---|---|
| 8,538,970 | B1 * | 9/2013 | Tucker | G06F 17/3053 707/748 |
| 8,661,012 | B1 * | 2/2014 | Baker et al. | 707/706 |
| 2008/0040321 | A1 * | 2/2008 | Baeza-Yates | 707/3 |
| 2009/0012944 | A1 * | 1/2009 | Rodriguez | G06F 17/30395 |
| 2009/0187467 | A1 * | 7/2009 | Fang et al. | 705/10 |
| 2011/0099201 | A1 * | 4/2011 | Shen et al. | 707/771 |
| 2011/0191364 | A1 * | 8/2011 | LeBeau et al. | 707/767 |
| 2011/0258227 | A1 * | 10/2011 | Lacasse | G06F 17/3069 707/769 |
| 2011/0283190 | A1 * | 11/2011 | Poltorak | G10L 13/033 715/716 |

OTHER PUBLICATIONS

Alonso et al, "Clustering and Exploring Search Results Using Timeline Constructions", CIKM'09, Nov. 2-6, 2009, Hong Kong, China, Copyright 2009.*
Atserias et al, "Searching through time in the New York Times", HCIR 2010 New Brunswick, NJ USA.*
Baeza-Yates et al, "Query Recommendation Using Query Logs in Search Engines", Current Trends in Database Technology—EDBT 2004 Workshops, Lecture Notes in Computer Science vol. 3268, 2005, pp. 588-596, Springer-Verlag Berlin Heidelberg 2004.*

(Continued)

*Primary Examiner* — Stanley K Hill
*Assistant Examiner* — Ilya Traktovenko
(74) *Attorney, Agent, or Firm* — Berkeley Law & Technology Group LLP

(57) ABSTRACT

Methods and systems are provided that may be utilized to rank related news predictions and to provide one or more predictions to a user. In a particular implementation, one or more digital signals representing a query may be generated at least partially in response to an article being accessed by a user. One or more digital signals representing one or more predictions comprising one or more sentence portions having one or more references to one or more future dates may be obtained based at least in part on a comparison of the one or more digital signals representing the query with one or more digital signals representing a prediction index.

17 Claims, 5 Drawing Sheets

(56) References Cited

OTHER PUBLICATIONS

Cao et al, "Context-Aware Query Suggestion by Mining Click-Through and Session Data", KDD'OB. Proceedings of the 14th ACM SIGKOO internat ional conference on Knowledge discovery and data mining, pp. 875-883, Aug. 24-27, 2008, Las Vegas, Nevada, USA.*
Alonso, et. al., On the Value of Temporal Information in Information Retrieval, ACM SIGIR Forum, vol. 41, No. 2, Dec. 2007, 7 pages.
Asuncion, et. al., On Smoothing and Inference for Topic Models, UAI '09 Proceedings of the Twenty-Fifth Conference on Uncertainty in Artificial Intelligence, Arlington, Virginia, U.S.A., 2009, 8 pages.
Baeza-Yates, Ricardo, Searching the Future, ACM SIGIR Workshop MF/IR 2005, 6 pages.
Balog, et. al., A Language Modeling Framework for Expert Finding, Information Processing and Management 45, 2009, 19 pages.
Berberich, et. al., A Language Modeling Approach for Temporal Information Needs, Max-Planck-Institut für Informatik, www.mpi-inf.mpg.de/reports, Jan. 2010, 34 pages.
Blanco, Roi and Hugo Zaragoza, Finding Support Sentences for Entities, SIGIR '10, Geneva, Switzerland, Jul. 19-23, 2010, 8 pages.
Blei, et. al., Latent Dirichlet Allocation, Journal of Machine Learning Research 3, 2003, 30 pages.
Canton, Ph.D., James, The Extreme Future: The Top Trends That Will Reshape the World for the Next 5, 10 and 20 Years, 2006, 4 pages.
Crammer, et. al., Online Passive-Aggressive Algorithms, Journal of Machine Learning Research 7, 2006, 35 pages.
Demartini, et. al., INEX-XER: Entity Ranking Overview Talk 2008, 25 pages.
Diaz, Fernando and Rosie Jones, Using Temporal Profiles of Queries for Precision Prediction, SIGIR '04, Sheffield, South Yorkshire, UK, Jul. 25-29, 2004, 7 pages.
Elsas, Jonathan L. and Susan T. Dumais, Leveraging Temporal Dynamics of Document Content in Relevance Ranking, WSDM '10, New York City, USA, Feb. 4-6, 2010, 10 pages.
Griffiths, Thomas L. and Mark Steyvers, Finding Scientific Topics, PNAS, vol. 101, Suppl. 1, Apr. 6, 2004, 8 pages.
Jatowt, et. al., Supporting Analysis of Future-related Information in News Archives and the Web, JCDL '09, Austin, Texas, Jun. 15-19, 2009, 10 pages.
Joachims, Thorsten, Optimizing Search Engines Using Clickthrough Data, SIGKDD '02, Edmonton, Alberta, Canada, 10 pages, Date is: 2002.
Kalczynski, Pawel Jan and Amy Chou, Temporal Document Retrieval Model for Business News Archives, Information Processing and Management 41, 2005, 16 pages.
Kanhabua, Nattiya and Kjetil Nørvåg, Determining Time of Queries for Re-Ranking Search Results, ECDL '10 Proceeding of the 14th European Conference on Research and Advanced Technology for Digital Libraries, Berlin, Germany, 2010, 12 pages.
Lathia, et. al., Temporal Diversity in Recommender Systems, SIGIR '10, Geneva, Switzerland, Jul. 19-23, 2010, 8 pages.
Li, Xiaoyan and W. Bruce Croft, Time-Based Language Models, CIKM '03 Proceedings of the Twelfth International Conference on Information and Knowledge Management, New York, NY, 2003, 7 pages.
Li, Xiaoyah and W. Bruce Croft, Improving Novelty Detection for General Topics Using Sentence Level Information Patterns, CIKM '06, Arlington, VA, Nov. 5-11, 2006, 10 pages.
Liu, Tie-Yan, Learning to Rank for Information Retrieval, Microsoft Research, 2001, 154 pages.
Macdonald, Craig and Iadh Ounis, Searching for Expertise: Experiments with the Voting Model, The Computer Journal, 2008, 20 pages.
Matthews, et. al., Searching Through Time in the New York Times, HCIR Challenge 2010, New Brunswick, NJ, 4 pages.
Metzler, et. al., Improving Search Relevance for Implicitly Temporal Queries, SIGIR '09, Boston, MA, Jul. 19-23, 2009, 2 pages.
Pazzani, Michael J. and Daniel Billsus, Content-Based Recommendation Systems, LNCS: Lecture Notes in Computer Science, Berlin, Germany, 2007, 18 pages.
Robertson, S.E. and S. Walker, Some Simple Effective Approximations to the 2-Poisson Model for Probabilistic Weighted Retrieval, SIGIR '94 Proceedings of the 17th Annual International ACM SIGIR Conference on Research and Development in Information Retrieval, New York, NY, 1994, 10 pages.
Schumaker, et. al., Textual Analysis of Stock Market Prediction Using Breaking Financial News: The AZFinText System, ACM Transactions on Information Systems, vol. 27, No. 2, Article 12, 2009, 19 pages.
Shalev-Shwartz, et. al., Pegasos: Primal Estimated sub-GrAdient SOlver for SVM, Proceedings of the 24th International Conference on Machine Learning, Corvallis, OR, 2007, 8 pages.
Song, et. al., Topic and Keyword Re-ranking for LDA-based Topic Modeling, CIKM '09, Hong Kong, China, Nov. 2-6, 2009, 4 pages.
Surdeanu, et. al., Learning to Rank Answers on Large Online QA Collections, Proceedings of ACL-08: HLT, Columbus, OH, 2008, 9 pages.
Wang, Xuerui and Andrew McCallum, Topics Over Time: A Non-Markov Continuous-Time Model of Topical Trends, ACM SIGKDD-2006, Philadelphia, PA, Aug. 20-23, 2005, 10 pages.
Wei, Xing and W. Bruce Croft, LDA-Based Document Models for Ad-hoc Retrieval, SIGIR '06, Seattle, WA, Aug. 6-11, 2006, 8 pages.
Yue, et. al., A Support Vector Method for Optimizing Average Precision, SIGIR '07, Amsterdam, The Netherlands, Jul. 23-27, 2007, 8 pages.
Zaragoza, et. al., Ranking Very Many Typed Entities on Wikipedia, CIKM '07 Proceedings of the Sixteenth ACM Conference on Conference on Information and Knowledge Management, New York, NY, 2007, 4 pages.
Zhang, Tong, Solving Large Scale Linear Prediction Problems Using Stochastic Gradient Descent Algorithms, Proceedings of the 21st International Conference on Machine Learning, Banff, Canada, 2004, 8 pages.

* cited by examiner

METHOD OR SYSTEM FOR RANKING RELATED NEWS PREDICTIONS

BACKGROUND

1. Field

The subject matter disclosed herein relates to a method or system for retrieving or displaying related news predictions.

2. Information

Predicting one or more future events may, for example, be a goal of individuals working within the financial industry. Leaders of organizations may analyze information related to future events in order to identify challenges that may directly affect their related organizations. Individuals may also have anticipation or curiosity about the future. Future trends may influence lives, jobs, businesses, or even global events. Future trends may include, for example, an energy crisis, a global financial crisis, politics, health care, science, securities, globalization, climate changes, or disruptive technologies. People who read news stories may be naturally curious about potential future events. An obsession with the future may be reflected within news articles themselves.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

Figure 1:
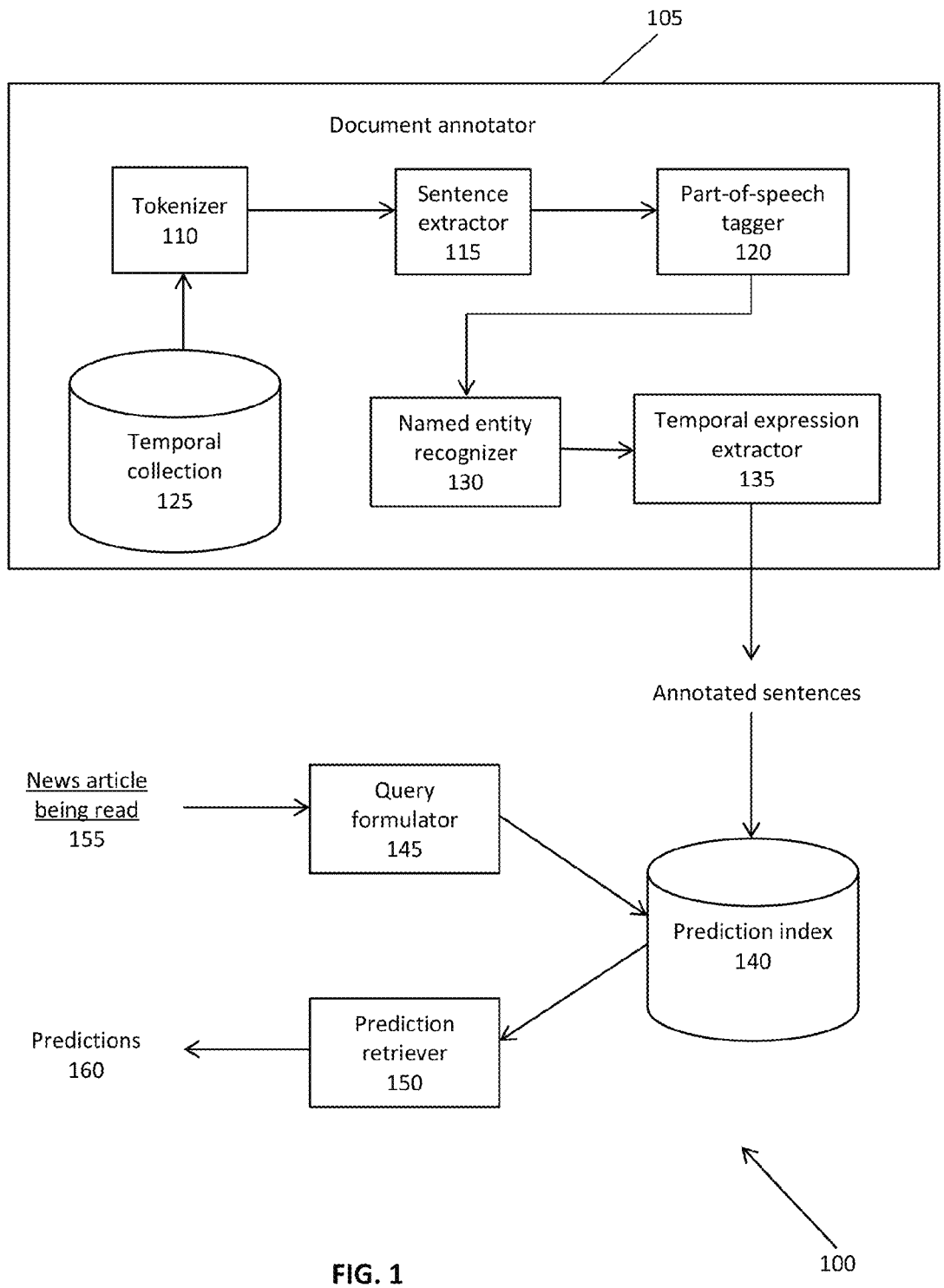
FIG. 1 is schematic diagram of a prediction retrieval system according to an implementation.

Reference throughout this specification to "one example", "one feature", "an example", or "a feature" means that a particular feature, structure, or characteristic described in connection with the feature or example is included in at least one feature or example of claimed subject matter. Thus, appearances of the phrase "in one example", "an example", "in one feature" or "a feature" in various places throughout this specification are not necessarily all referring to the same feature or example. Furthermore, particular features, structures, or characteristics may be combined in one or more examples or features.

It has been estimated that nearly one third of news articles contain references to future events. Although references to future events may be useful to provide an understanding of news stories and how events may develop for a given topic, accessing such information may be difficult. One or more embodiments as discussed herein address an issue of retrieving or ranking sentences within one or more articles that contain mentions to future events, which may be referred to here as ranking of related news predictions. A "learning to rank" approach may be based at least in part on different classes of article features, such as, for example, term similarity, entity-based similarity, topic similarity, or temporal similarity, to name just four examples. It should be appreciated, however, that more or fewer than four article features may be considered. Such an approach may, for example, retrieve a relatively significant number of relevant predictions related to a given topic.

Accessing references to future events in an intuitive manner may, for example, improve a manner in which people read or understand the news. As discussed herein, related news predictions may be ranked to directly address an issue of predicting future events by finding predictions related to a news story in a news archive, for example, and ranking the related news predictions according to their respective relevance to a particular news story or article. By predicting future news events, for example, user engagement may be increased by presenting or otherwise providing content that directly addresses news or information needs of users. By providing links to relevant content, new sites may keep users engaged on a particular website for an increased length of time to thereby increase a likelihood that the users may select, such as by using a computer mouse to "click on," revenue generating links or to improve user satisfaction. For a wide range of news events from natural disasters to political unrest in the middle east, content presented may answer a question on many readers' minds, e.g., "what is going to happen next?"

A query may be automatically extracted or generated from a news article currently being accessed or read by a user, and the query may be comprised of a collection or bag of entities or terms. An automatically-generated query may be utilized to retrieve predictions, rank the predictions over a time dimension, and display or otherwise present the ranked predictions to a user. Predictions may be extracted from different sources such as, for example, news publications, blogs, trade publications, government web sites, or financial databases, to name just a few among many possible examples of sources. A query may be created or generated by selecting a topic of interest, such as relating to "Financial Markets" and may specify an entity, such as, for example, people, companies, or organizations, from a set of "pre-defined" entities in a particular implementation. A system may subsequently retrieve one or more predictions related to a selected topic and entity.

In a particular implementation, a system as discussed herein may automatically create or generate a query for a user that is not limited to "predefined" topics or entities. A particular embodiment of system may extract predictions from document collections and may allow users to search for predictions using ad-hoc queries, for example.

An embodiment of a system may formalize a task of ranking related news predictions. An evaluation dataset may be generated with relevance judgments from a particular corpus with queries selected from real-world future trends. A learned ranking model may incorporate classes of features including, for example, term similarity, entity-based similarity, topic similarity, or temporal similarity.

FIG. 1 is schematic diagram of a prediction retrieval system 100 according to an implementation. In a particular implementation, prediction retrieval system 100 may include a document annotator 105 comprising a tokenizes 110, sentence extractor 115, part-of-speech tagger 120, temporal collection 125, named entity recognizer 130, or temporal expression extractor 135. Prediction retrieval system 100 may also include a prediction index 140, query formulator 145, or prediction retriever 150.

Figure 2:
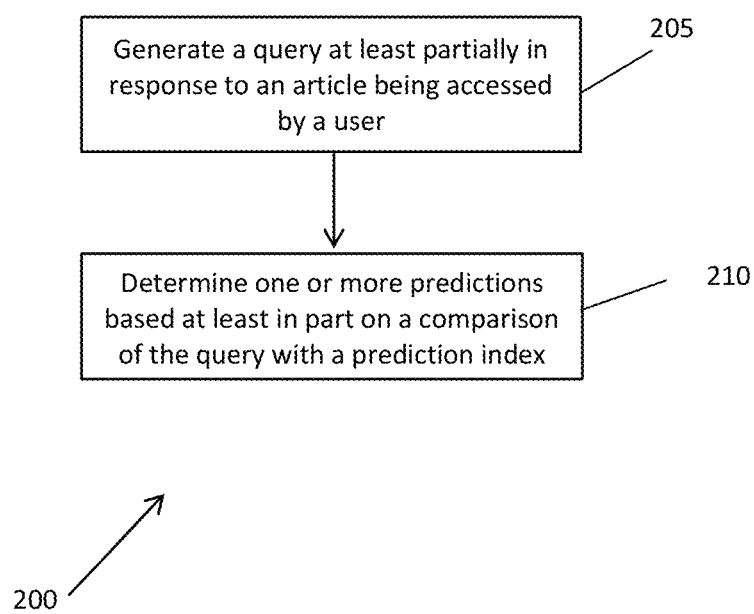
FIG. 2 is a flowchart of a process for determining one or more predictions according to an implementation.

FIG. 2 is a flowchart of a process 200 for determining one or more predictions according to an implementation. Embodiments in accordance with claimed subject matter may include all of, less than, or more than blocks 205-210. Also, the order of blocks 205-210 is merely an example order. At operation 205, a query may be generated at least partially in response to an article being accessed by a user. At operation 210, one or more predictions may be determined based at least in part on a comparison of the query with a prediction index. The one or more predictions may comprise one or more sentence portions having one or more references to one or more future dates.

Referring to FIG. 1, if a news article 155 is viewed or read by a user, for example, prediction retrieval system 100 may generate one or more related predictions 160. A "prediction," as used herein may refer to a sentence containing a future date related to a given news article 155 being read. Predictions 160 may be extracted from temporal document collection 125. Temporal document collection 125 may comprise a collection of documents that comprises time-stamped documents such as, for example, personal emails, news archives, company websites, or blogs, to name just a few among many possible examples. Predictions may be automatically extracted from news archives using one or more different annotation tools.

A news article 155 may be viewed by a user via a web browser or some other type of application capable of presenting a news article to a user. It should be appreciated that in an implementation, a news article may comprise various types of multimedia, including, for example, alphanumeric text, images, or videos, to name just a few possible examples of presentation formats for news articles. If a news article 155 is viewed or read by a user, query formulator 145 may generate a query via an automated process. In an implementation, a generated query may comprise one or more keywords and a time of the generated query. A generated query may be transmitted or otherwise provided to prediction index 140, as shown in FIG. 1. Prediction index 140 may be accessed by a prediction retriever 150 to obtain one or more predictions based at least in part on a matching of a generated query formed by query formulator 145 and prediction index 140. One or more predictions 160 may subsequently be presented to a user.

Document annotator 105 may generate one or more annotated sentences or phrases supplied to prediction index 140. As shown in FIG. 1, document annotator 105 may comprise a temporal collection 125. Temporal collection 125 may include a collection of articles, such as news-related articles, blog posts, or Twitter™ tweets, for example, which are associated with time stamps. Tokenizer 110 may retrieve articles from temporal collection 125 and may generate one or more tokens for a particular article. A "token," as used herein, may refer to a string of characters categorized according to one or more rules as a symbol. A process of forming tokens from an input stream of characters may be referred to herein as "tokenization." A token may comprise an item to process an input text stream or text file, for example.

Sentence extractor 115 may extract one or more sentences from an output stream of characters from tokenizer 110. Part-of-speech tagger 120 may distinguish between or among punctuation and words or terms of a sentence, for example. Part-of-speech tagger 120 may, for example, mark one or more the token with a corresponding linguistic category. Named entity recognizer 130 may, for example, identify one or more named entities within a received sentence. Temporal expression extractor 135 may, for example, extract one or more temporal expressions.

An output of document annotator 105 may comprise a set of sentences annotated with named entities and temporal expressions, for example, which may be indexed as predictions within prediction index 140 for further processing or retrieval.

A component of an annotation process is extraction of temporal expressions by temporal expression extractor 135 using a time and event recognition process, relation, or algorithm. Such a process may extract temporal expressions mentioned or otherwise referenced within a document and may normalize the temporal expression to dates so that the temporal expressions may be anchored on a timeline. There may be different types of temporal expressions, such as explicit, implicit, or relative expressions.

An "explicit temporal expression," as used herein may refer to a temporal expression that recites a particular date, for example. An explicit temporal expression may be mapped directly to a time point or interval, such as, dates or years on the Gregorian calendar. For example, "Jul. 4, 2010" or "Jan. 1, 2011" may comprise examples of explicit temporal expressions.

An "implicit temporal expression," as used herein, may refer to a temporal expression that includes an imprecise time point or interval such as, for example, a holidays or a date for an event. For example, "Independence Day 2010" or "the New Year Day's 2011" may comprise examples of implicit expressions that may be mapped to "Jul. 4, 2010," or "Jan. 1, 2011," respectively.

A "relative temporal expression," as used herein may refer to a temporal expression mentioned in a document that may be resolved to a time point or interval using a time reference. For example, a relative temporal expression may comprise an explicit or an implicit temporal expression mentioned in a document or a publication date of the document itself. For example, temporal expressions such as "this Monday" or "next month" may comprise relative temporal expressions and may be mapped to exact dates using a publication date of a document in which they are recited.

Referring back to FIG. 1, a query may be automatically generated by query formulator 145 if an explicit information need is provided by a user. For example, it may be assumed that a user's information needs lie within a news article 145 being read by the user, and a query may therefore be generated or extracted from news article 155, as discussed further below. For a given news article 145, predictions may be retrieved that may be relevant to the news article 145, such as, for example, relevant sentences containing future dates with respect to a publication date of the news article 145 being read.

It should be appreciated that in one particular implementation, query formulator 145 may reside on or be implemented by a computing device utilized by a user to also view an article. In another implementation, for example, query formulator 145 may reside one or be implemented by a server or other network device that is separate from a computing device utilized by a user to view an article.

In a particular implementation, a user may view an article on that user's computing device, such as a computer, interactive television, or some other device capable of displaying an article, such as a device comprising a display. In an implementation, a user may view an article via a web browser and the article may be transmitted via one or more signals from a server to a computing device of the user. If a user views or otherwise accesses an article, one or more signals may be transmitted from the user's computing device to a server to indicate that the user is accessing or reading the article. One or more servers may comprise or implement one or more of query formulator 145, prediction retriever 150, prediction index 140, or document annotator 105. If one or more signals are received that indicate that a user is accessing or otherwise viewing an article, query formulator 145 may automatically generate a query based at least in part on one or more features or characteristics of the article. Query formulator may access prediction index 140 to identify or otherwise obtain one or more predictions matching a generated query based at least in part on a comparison of one or more features or characteristics of the query or article being access relative to one or more predictions stored within prediction index 140, for example.

In an implementation in which query formulator 145 resides on or is implemented by a computing device utilized by a user to also view an article, a query generated by query formulator 145 may be transmitted to a server to access prediction index 140. In one implementation, for example, prediction index 140 may reside within a database or other memory device accessible by a user.

In one or more implementations, temporal collection 125 or prediction index 140 may be stored in one or more databases or memory devices, for example.

Predictions retrieved by prediction retriever 150 may be ranked based at least in part on a degree of relevance, where a prediction is determined to be "relevant" if it comprises future information about one or more topics of news article 145. In an implementation, there may not be any specific rules or instructions regarding about how dates involved are related to relevance. Nevertheless, in an implementation, it may be hypothesized that predictions extracted from more recent documents are more relevant.

A machine learning approach may be implemented to learn a ranking model of predictions. In an implementation, a machine learning approach may involve identifying different classes of features to measure a relevance of a prediction with respect to a news article 145, as discussed further below.

Temporal collection 125 of document annotator 105 may comprise a number of news articles defined as $C=\{d_1, \ldots, d_n\}$ where C comprises a collection of news articles and $d_1, \ldots, d_n$ comprise different documents. A news article may be treated as a bag-of-words such that document $d=\{w_1, \ldots, w_n\}$, where $w_1, \ldots, w_n$ comprise different words. A bag-of-words may comprise an unordered list of terms or features. Time(d) may comprise a function given a creation or publication date of document d. One or more features may be extracted from annotated documents. For a document d, there may be an associated annotated document $\hat{d}$, which may be comprised of three sets such as $\hat{d}_e$, $\hat{d}_t$, or $\hat{d}_s$. $\hat{d}_e$ may comprise a set of named entities such that $\hat{d}_e=\{e_1, \ldots, e_n\}$. An entity $e_i \in \epsilon$ and $\epsilon$ may comprise a set of entities (e.g., such as a person, location, or organization) in collection C, a set of annotated temporal expressions $\hat{d}_t=\{t_1, \ldots, t_m\}$, and a set of sentences $\hat{d}_s=\{s_1, \ldots, s_m\}$.

A prediction p may be viewed as a sentence containing one or more field/value pairs of annotations. $d_p$ may be defined as a parent document from which prediction p is extracted. One or more fields may be defined for a prediction such as, for example, an identifier (ID), a PARENT_ID, TITLE, ENTITY, FUTURE_DATE, PUB_DATE, TEXT, or CONTEXT. A field ID may, for example specify a unique identification number, code, or alphanumeric string. In a particular implementation, PARENT_ID and TITLE may specify a unique number and a title of document $d^p$, respectively. ENTITY may comprise a set of annotated entities $p_{entity} \subset \hat{d}_e$. FUTURE_DATE may comprise a set of future temporal expressions $p_{future}$ annotated in p. PUB_DATE may comprise a publication date of parent document $d^p$. TEXT may comprise is prediction's text $p_{txt}$ or a sentence within p. It should be noted that in an implementation, a prediction may contain one or more "future" temporal expression such that $p_{future} \neq 0$. In addition, a context of prediction $p_{ctx}$, represented by a CONTEXT field, may be defined as surrounding sentences of a main sentence. Context $p_{ctx}$ may be defined as a sentence immediately before and a sentence immediately after $p_{txt}$ in a particular implementation.

Table 1 shown below illustrates an example of a prediction with associated field/value pairs.

TABLE 1

| Field | Value |
|---|---|
| ID | 1136243_1 |
| PARENT_ID | 1136243 |
| TITLE | Gore Pledges A Health Plan For Every Child |
| TEXT | Vice President Al Gore proposed today to guarantee access to affordable health insurance for all children by 2005, expanding on a program enacted two years ago that he conceded had had limited success so far. |
| CONTEXT | Mr. Gore acknowledged that the number of Americans without health coverage had increased steadily since he and President Clinton took office. |
| ENTITY | Al Gore |
| FUTURE_DATE | 2005 |
| PUB_DATE | 1999 Sep. 8 |

As shown, Table 1 includes various fields, such as ID, PARENT_ID, TITLE, ENTITY, FUTURE_DATE, PUB_DATE, TEXT, or CONTEXT. In this example, field ID has a value "1136243_1" and PARENT_ID has a value "1136243_1." TITLE has a value "Gore Pledges A Health Plan For Every Child." TEXT has a value "Vice President Al Gore proposed today to guarantee access to affordable health insurance for all children by 2005, expanding on a program enacted two years ago that he conceded had had limited success so far." CONTEXT has a value "Mr. Gore acknowledged that the number of Americans without health coverage had increased steadily since he and President Clinton took office." ENTITY has a value "Al Gore." FUTURE_DATE has a value "2005" and PUB_DATE has a value "1999/09/08."

Referring again to FIG. 1, a query q may be automatically generated by query formulator 145 at least partially in response to a news article $d^q$ 155 being viewed or otherwise accessed or read by a user. Query q may comprise at least two portions or parts—e.g., one or more keywords $q_{text}$, and a time associated with the query q, such as a time at which query q is generated, denoted as $q_{time}$. $q_{text}$ may be extracted from $d^q$ in different ways to result in different types of queries.

A first type of query may be referred to as a bag of entities, noted as an "entity query" or $Q_E$ where a corresponding $q_{text}$ is comprised of a top m number of entities, for example ranked by frequency, extracted from $d^q$. Intuitively, an aspect is to determine whether using only key entities frequently mentioned in a news article may retrieve relevant predictions with a high precision. In an example, given an actual document about "President Bush and the Iraq war," a $Q_E$ with $q_{text}=\{\text{George Bush, Iraq, America}\}$. At retrieval time, $q_{text}$ may be matched with an entity field of predictions.

A second type of query may be referred to as a "term query" or $Q_T$ where a corresponding qtext is comprised of a top n number of terms, for example ranked by term weighting such as term frequency-inverse document frequency (TF-IDF) extracted from $d^q$. $Q_T$ may be considered a bag of terms important to both $d^q$ (locally) and a whole collection (globally). In contrast to a previously mentioned first query type, $Q_T$ may be aimed at retrieving predictions related to one or more topics of a news article, which may be represented as a set of informative terms. As an example, a $Q_T$ with $q_{text}=\{\text{poll, bush, war, Iraq}\}$ may be extracted from the same document as the $Q_E$ example discussed above. In this case, $q_{text}$ may be matched with a text field of predictions.

The third type of query may be referred to as a "combined query" or $Q_C$, where a corresponding $q_{text}$ comprises a combination of both a top m number of entities and a top n number of terms. $q_{text}$ may be represented by concatenating $Q_E$ and $Q_T$.

A component of a query is a temporal criteria or $q_{time}$ which may be used for retrieving predictions on a time dimension. $q_{time}$ may be comprised of different time constraints in a particular implementation. A first constraint may be specified in order to retrieve predictions that are future relative to a publication date of a query's parent article, or time($d^q$). A second constraint may indicate predictions belonging to news articles published before time($d^q$). Both time constraints may be represented using a time interval, e.g., [$t_b$, $t_e$], where $t_b$ comprises a beginning time point, $t_e$ comprises an ending time point, and $t_e > t_b$. A first constraint may comprise [time($d^q$), $t_{max}$], and a second constraint may comprise [$t_{min}$, time($d^q$)], where (time($d^q$), $t_{max}$]=[time($d^q$), $t_{max}$]-{time($d^q$)}, and $t_{max}$ and $t_{min}$ comprise a maximum time in the future and a minimum time in the past respectively. At retrieval time, the first constraint may be matched with a field FUTURE_DATE of predictions, whereas the second constraint may be matched with a field PUB_DATE of predictions.

One or more features may be utilized to learn a ranking model for related news predictions. One or more classes of features may capture a similarity between a news article query q and a prediction p, such as, for example, term similarity, entity-based similarity, topic similarity, or temporal similarity, as discussed further below.

"Term similarity," as used herein, may refer to similarity of semantic meanings of different terms, for example.

Since a prediction may be defined with multiple fields, fielded searching may be utilized as provided with an Apache Lucene™ search engine. Apache Lucene™ may comprise a high-performance, full-featured text search engine library written entirely in Java™. Apache Lucene™ may comprise a technology suitable for an application that utilizes full-text search, such as, for example, cross-platform. Apache Lucene™ comprises an open source project. A term similarity feature retScore may comprise a default similarity scoring function of the Apache Lucene™ which may comprise a variation of a TF-IDF weighting scheme.

Despite its simplicity, retScore may have a disadvantage because of a reliance on "term matching." For example, the more times a query term appears in a prediction, the more relevant that prediction may be to the query. However, it may not be possible unable to give a high score to a prediction if terms of the prediction do not match exactly with query terms even if the query terms might have semantic meanings similar meanings to those of the prediction terms. One technique to overcome this drawback is via use of query expansion or reformulation using synonyms or different words with similar semantic meanings. However, in accordance with a technique as discussed below, instead of reformulating a query, a prediction may instead be retrieved by analyzing one or more of CONTEXT, TITLE, or TEXT fields. Accordingly, even if a TEXT field does not match exactly with a query term, prediction p may receive a score if either a CONTEXT or TITLE field matches a query term.

Extending a sentence structure by its surrounding sentences and placing such context sentences in a different field weighted based at least partially on field aware ranking functions such as bm25f may improve sentence retrieval in one particular implementation.

In an implementation as discussed below, however, instead of weighting differently keyword matches in a title or body of a web page, different importance values may be assigned to matches within a sentence itself or its context. A second term similarity feature bm25f can be computed as shown below in Relation (1).

$$bm25f(q, p, F) = \sum_{w_i \in q} \frac{weight(w_i, p)}{k_1 + weight(w_i, p)} \cdot idf(w_i) \quad (1)$$

$$weight(w_i, p) = \sum_{f \in F} \frac{freq(w_i, f) \cdot boost(f)}{(1 - b_f) + b_f \cdot \frac{l_f}{avl_f}}$$

$$idf(w_i) = \log \frac{N_P - n_{w_i} + 0.5}{n_{w_i} + 0.5}$$

In Relation (1), $l_f$ may comprise a field length, $avl_f$ may comprise an average length for a field f, $b_f$ may comprise a constant related to the field length, $k_1$ may comprise a free parameter, and boost(f) may comprise a boost factor applied to a field f. $N_p$ may comprise a total number of predictions, $n_{wi}$ may comprise a number of prediction containing and where F={TEXT, CONTEXT, TITLE}.

"Entity-based similarity," as used herein, may refer to similarity between two items based at least in part on a similarity of entities contained within the items. It should be noted that features within an entity-based similarity class may be parameter-free. An entity-based similarity feature class may, for example, measure a similarity between query q and prediction p by measuring a similarity of entities contained within q and p, respectively. It should be appreciated that a class of entity-based similarity features may be applicable to a query comprised of entities, such as $Q_E$ and $Q_C$, but may not be applicable to $Q_T$, which is not comprised of entities. A feature entitySim may compare a string similarity between entities of q and $p_{entity}$ using a Jaccard coefficient, which may be computed as shown in Relation (2).

$$entitySim(q, p) = \frac{|q \cap p_{entity}|}{|q \cup p_{entity}|} \quad (2)$$

In Relation (2), $p_{entity}$ may comprise a set of entities |q∩$p_{entity}$| and |q∪$p_{entity}$| may comprise a size of intersection and union of entities of query q and prediction p. Thus, the higher the overlap between entities of prediction p and query q, the higher prediction p may be ranked for query q. Predictions may be ranked based at least partially on features that are employed in an entity ranking task. For example, an entity may be relevant if the entity appears within a title of a document, or if the entity occurs one or more times as a subject of sentence. Features from entity ranking may be applied based at least partially upon an assumption that more relevant entities that a prediction contains, the more relevant the features are. Entity-based features may be extracted and computed relative to a parent document of a prediction, $d_p$, or on a prediction itself, p.

Features extracted from an article or document may include, for example, title, titleSim, senPos, senLen, cntSenSubj, cntEvent, cntFuture, cntEventSubj, cntFutureSubj, timeDistEvent, timeDistFuture, or tagSim, as discussed below. Features extracted from predictions may include is Subj or timeDist, as are also discussed further below.

A value of a feature may be normalized to a range from 0 to 1, for example. A feature title may indicate whether an entity e is in a title of $d^p$. Relation (3) indicates how a feature title is calculated. A feature title may have a value of "1" if entity e appears within a title of $d^p$, or "0" if otherwise.

$$title(e, d^p) = isInTitle(e, d^p) \quad (3)$$

Feature titleSim may comprise a string similarity between e and a title of $d^p$. Relation (4) indicates how a feature titleSim may be calculated.

$$titleSim(e, d^p) = \frac{|e \cap title(d^p)|}{|e \cup title(d^p)|} \quad (4)$$

Feature senPos may indicate a position of a first sentence within document $d^p$ where e occurs. Relation (5) indicates how a feature senPos may be calculated. $len(d^p)$ may indicate a length of $d^p$ in words. $pos(s_y)$ may indicate a position of a sentence $s_y$ within $d^p$.

$$senPos(e, d^p) = \frac{len(d^p) - pos(firstSen(e))}{len(d^p)} \quad (5)$$

senLen may indicate a length of a first sentence of e. Relation (6) indicates how a feature senLen may be calculated.

$$senLen(e, d^p) = \frac{len(firstSen(e))}{\max_{s_y \in d^p} len(s_y)} \quad (6)$$

cntSenSubj may indicate a number of sentences in which e is a subject. In a particular implementation, a dependency parser may be operated over one or more sentences to determine whether an entity is a subject. Relation (7) indicates how a feature cntSenSubj is calculated. $S_e$ may comprise a set of all sentences of e within $d^p$. is Subj($e, s_y$) may have a value of "1" if e is a subject of $s_y$.

$$cntSenSubj(e, d^p) = \frac{1}{|S_e|} \sum_{s_y \in S_e} isSubj(e, s_y) \quad (7)$$

cntEvent may comprise a number of event sentences (e.g., or sentences annotated with dates) of e. Relation (8) indicates how feature cntEvent is calculated. $\epsilon_d^p$ may comprise a set of all event sentences in $d^p$. is Equal($s_z, s_y$) may have a value of "1" if $s_z$ is equal to $s_y$. cntFuture may comprise a number of sentences which mention a future date.

$$cntEvent(e, d^p) = \frac{1}{|\epsilon_d^p|} \sum_{s_z \in \epsilon_d^p} \sum_{s_y \in S_e} isEqual(s_z, s_y) \quad (8)$$

cntEventSubj may comprise a number of event sentences in which e is a subject. Similarly, cntFutureSubj may comprise a number of future sentences in which e is a subject. Relation (9) indicates how feature cntEventSubj may be calculated.

$$cntEventSubject(e, d^p) = \frac{1}{|\epsilon_d^p|} \sum_{s_z \in \epsilon_d^p} isSubj(e, s_z) \quad (9)$$

timeDistEvent may comprise a measure of a distance between e and dates within $d^p$. Relation (10) indicates how feature timeDistEvent is calculated.

$$timeDistEvent(e, d^p) = \frac{1}{|\epsilon_e|} \sum_{s_z \in \epsilon_\epsilon} avg(normDist(e, s_z)) \quad (10)$$

Relation (11) indicates how normDist($e, s_z$) may be calculated.

$$normDist(e, s_z) = \frac{1}{|T_{s_z}|} \sum_{t_k \in T_{s_z}} \frac{maxDist(s_z) - dist(e, t_k)}{maxDist(s_z)} \quad (11)$$

dist($w_i, w_j$) may equal $|pos(w_i) - pos(w_j)| - 1$. $\epsilon_e$ may comprise a set of event sentences of e. $T_{sz}$ may comprise a set of temporal expressions within $s_z$. dist($w_i, w_j$) may comprise a distance in words between terms $w_i$ and $w_j$. maxDist($s_z$) may comprise a maximum distance between terms within $s_z$. timeDistFuture($e, d^p$) may comprise a distance between e and future dates in $d^p$ and which may also be computed to timeDistEvent.

tagSim may comprise a string similarity between e and an entity tagged in $d^p$. Relation (12) indicates how tagSim may be calculated. In Relation (12), $\mathcal{N}_d^p$ may comprise a set of entities tagged within $d^p$. Feature tagSim may be applicable for a collection provided with manually assigned tags such as, for example, the New York Times Annotated Corpus.

$$tagSim(e, d^p) = \max_{\epsilon_n \in \mathcal{N}_d^p} \frac{|e \cap e_n|}{|e \cup e_n|} \quad (12)$$

Feature isSubj(e, p) may have a value of "1" if e comprises a subject with respect to a prediction p, and timeDist(e, p) comprises a distance between e and future dates within p and which may also be computed to timeDistEvent.

"Topic similarity," as used herein, may refer to similarity between two items based at least in part on a similarity of topics contained within the items. A topic similarity class of features may compare a similarity query q and prediction p on a higher level by representing q and p using one or more topics. Examples of topics include, for example, "health care reform," "financial crisis," or "global warming". In one particular implementation, a document may be modeled with a low dimensionality or may use topics instead of terms.

According to an implementation as discussed herein, latent Dirichlet allocation (LDA) may be utilized to model a set of topics. LDA may comprise a generative model that allows sets of observations to be explained by unobserved groups which explain why some portions of a set of items are similar. For example, if observations are words collected into documents, LDA may posit that a document comprises a mixture of a small number of topics and that each word's creation is attributable to one of the document's topics.

LDA may be based on a generative probabilistic model that models documents as mixtures over an underlying set of topic distributions. In general, topic modeling may comprise two main steps. According to a first step, topic models may be learned from training data. In an implementation, LDA may specify that parameter $N_z$ or a number of topics be specified. After a model has been trained, for example, a next step may be to infer one or more topics from a learned topic model outputting a topic distribution for a prediction.

In one particular implementation, topic modeling may be incorporated for ad-hoc retrieval to show that linearly combining LDA with a query likelihood model outperforms non-topic models such as a unigram model, for example. In an implementation discussed below, LDA may be incorporated in a retrieval process in a different manner, however. First, for example, instead of combining LDA scores with an original retrieval score, query q and prediction p may be represented as vectors of topic distributions topic-based similarity may be computed by using a cosine similarity between two vectors. Second, a time dimension may be explicitly taken into modeling topics because topics distributions may evolve over time. Intuitively, topics may change over time according to trends, the world's interests, or occurrences of natural disasters, to name just a few possible examples.

Figure 3:
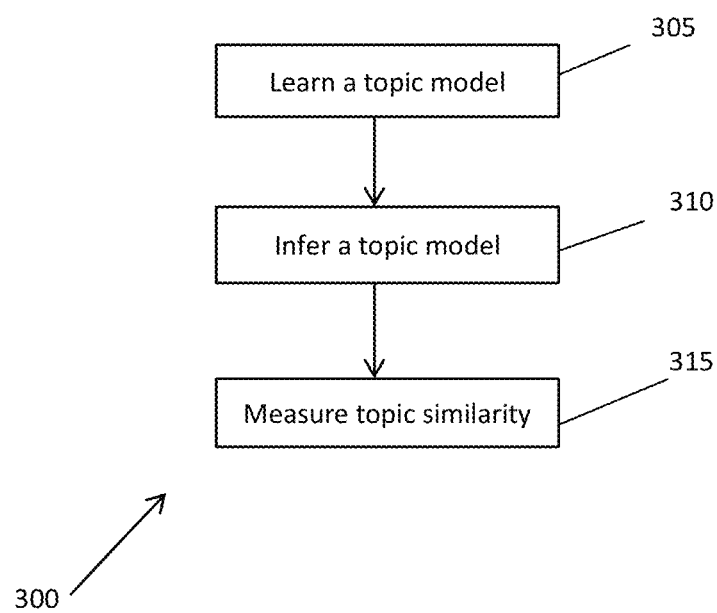
FIG. 3 is a flowchart of a process for applying topic modeling to future retrieval according to an implementation.

FIG. 3 is a flowchart of a process 300 for applying topic modeling to future retrieval according to an implementation. Embodiments in accordance with claimed subject matter may include all of, less than, or more than blocks 305-315. Also, the order of blocks 305-315 is merely an example order.

At operation 305, a topic model may be learned. At operation 310, a topic model may be inferred. At operation 315, a topic similarity may be measured. Implementations in accordance with FIG. 3 are discussed further below.

Figure 4:
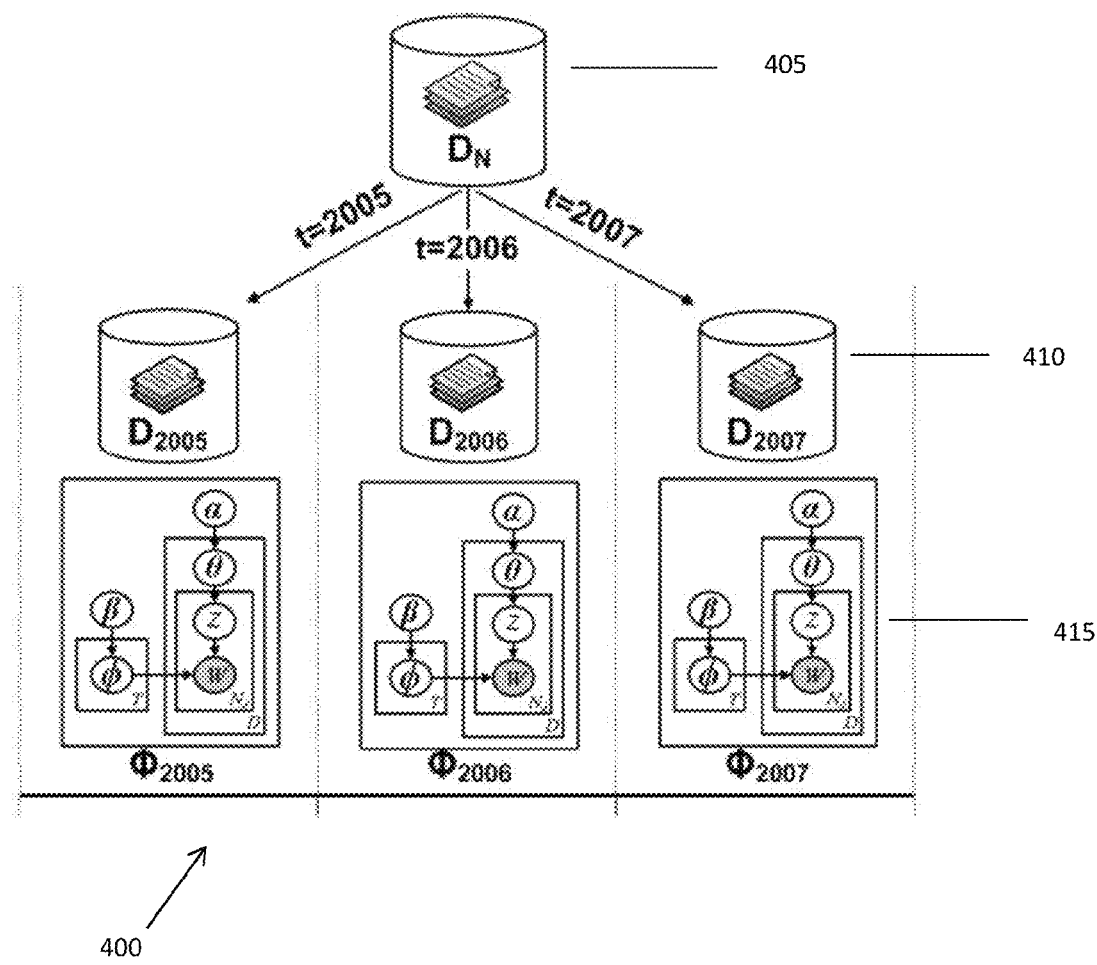
FIG. 4 illustrates LDA topic snapshots at different points in time according to an implementation.

At operation 305, a topic model may be learned that may account for a time dimension. FIG. 4 illustrates LDA topic snapshots 400 at different points in time according to an implementation. As shown in FIG. 4, at a first time or stage 405, a temporal document collection $D_N$ may initially contain documents associated with different times, such as the years 2005, 2006, or 2007, denoted as $D_{2005}$, $D_{2006}$, or $D_{2007}$ in FIG. 4. At a second time or stage 410, temporal documents may be separated into one or more sub-collections or document snapshots with respect to time, such as a first sub-collection comprising documents published within or otherwise associated with the year 2005, a second sub-collection comprising documents associated with the year 2006, or a third sub-collection comprising documents associated with the year 2007. At a third time or stage 415, documents within a sub-collection may be processed to learn training data to determine a "training data snapshot" with respect to the sub-collection.

In other words, documents may be arranged into sub-collections based at least in part on year of publication, and documents may be randomly selected as training data or training items, referred to herein as a "training data snapshot," e.g., $D_{train,tk}$ at time $t_k$.

Referring again to FIG. 3, at operation 310, a topic model may be inferred. One or more models learned at operation 305 may be utilized to determine one or more topics for query q and prediction p based at least in part on their respective contents. Topic model inference may represent a query q and a prediction p by a distribution or probability of topics. For example, given a topic model $\phi$, a prediction p may be represented as $p_\phi = p(z_1), \ldots, p(z_n)$, where p(z) gives a probability of a topic z obtained from $\phi$. As a result of topic models being learned from different time periods, a question remains as to which model snapshot to use for inference. In an implementation, query q and prediction p may be inferred from the same model snapshot in order to be comparable. A topic model may be selected for inference purposes in a number of ways. First, a topic model may be selected from a time snapshot time($d^q$) which may correspond to a publication date of a news article parent of q. Second, a topic model may be selected from a time snapshot t which may correspond to a publication date of a news article making prediction p, or time($d^p$).

Moreover, a prediction p may be inferred in different ways depending on contents used. In an implementation, a prediction p may be inferred based at least partially on (a) only text, $p_{txt}$; (b) both text, $p_{txt}$, and context, $p_{ctx}$; or (c) a parent document, $d^p$. For a query q, contents a parent document $d^q$ may be used for inference.

In addition to using all $N_z$ topics for inference, top-k topics ranked by the importance may be selected. Top-k topics may be selected, for example, since a process of measuring topic similarity using a too many topics may not be as accurate as using only the more important (or top-k) topics. Coverage or variation may be utilized to rank one or more topics.

A "topic coverage," denoted p(z), as used herein, may refer to one or more topics determined to cover a relatively significant portion of a corpus content. For example, one or more topics determined to cover a relatively significant portion of a corpus content may be considered to be more important than other topics covering relatively little content.

A "topic variation," denoted σ(z), as used herein may refer to one or more topics that appear in all or a relatively large number of documents of a corpus considered to be too generic to be interesting to user. Such topics may, however, have significant content coverage.

Topic coverage, μ(z), or topic variation, σ(z), may be computed using a mean or a standard deviation over one or more topic distributions. A final score for ranking a topic may be based at least in part on a product determined by multiplying values for topic coverage μ(z), and topic variation, σ(z). Relations (13) and (14) may be utilized to calculate topic coverage, μ(z), and topic variation, σ(z), for a topic z at time $t_k$:

$$\mu(z) = \frac{1}{\sum_{i=1}^{N_D} len(d_i)} \sum_{i=1}^{N_D} len(d_i) \cdot p_i(z) \quad (13)$$

$$\sigma(z) = \sqrt{\frac{1}{\sum_{i=1}^{N_D} len(d_i)} \sum_{i=1}^{N_D} len(d_i) \cdot (p_i(z) - \mu(z))^2} \quad (14)$$

In Relations (13) or (14), $N_D$ may refer to a number of documents in a training set at time $t_k$. $|D_{train,tk}| \cdot p_i(z)$ may yield a probability of a topic z in a document $d_i$. $len(d_i)$ may refer to a document length of $d_i$. A final score for ranking a topic z can be computed as:

$$\text{rank}(z) = \mu(z)^{\lambda_1} \cdot \sigma(z)^{\lambda_2} \quad (15)$$

In Relation (15), parameters $\lambda_1$ and $\lambda_2$ may indicate an importance of topic coverage, μ(z), and topic variation, σ(z), respectively. For example, if $\lambda_1 = 1$ and $\lambda_2 = 0$, a ranking may be determined based entirely by topic coverage. On the contrary, if $\lambda_1 = 0$ and $\lambda_2 = 1$, a ranking may be determined based entirely on topic variance.

Given a topic model $\phi$, a topic similarity may be calculated based at least in part on a cosine similarity between a topic distribution of query $q_\phi$ and a topic distribution of prediction $p_\phi$ as shown below in Relation (16):

$$topicSim(q, p) = \frac{q_\phi \cdot p_\phi}{\|q_\phi\| \cdot \|p_\phi\|} \quad (16)$$

$$= \frac{\sum_{z \in Z} q_{\phi_z} \cdot p_{\phi_z}}{\sqrt{\sum_{z \in Z} q_{\phi_z}^2} \cdot \sqrt{\sum_{z \in Z} p_{\phi_z}^2}}$$

A topical feature may be denoted using $LDA_{i,j,k}$, where i comprises one of two different methods for selecting a model snapshot: (a) i=1 for selecting a topic model from a time snapshot $time(d^q)$; and (b) i=2 for selecting from a time snapshot $time(d^p)$. j may comprise one of three different ways of using contents for inference: (a) txt, (b) ctx, or (c) parent. Finally, k may refer to whether the top-k of topics are utilized for inference. Accordingly, this relation may result in 12 (e.g., (3*2*2)) LDA-based features in total.

As discussed above, temporal expressions may be explicitly exploited in ranking. In one implementation, two features may be employed to measure temporal similarity between a query q and a prediction p.

A model of time may be represented using a time interval [b,e] having a starting point b and an end point e. An actual value of any time point, e.g., b or e in [b,e], is an integer or a number of time units (e.g., milliseconds or days) passed (or to pass) a reference point of time (e.g., a UNIX epoch).

A first feature TSU may be defined as the probability of generating a time of query $q_{time}$ from a document creation date time(d). TSU may be computed as shown below in Relation (17):

$$TSU = DecayRate^{\lambda \frac{|q_{time} - time(d)|}{\mu}} \quad (17)$$

In Relation (17), DecayRate and λ may comprise constants, where 0<DecayRate<1 and λ>0. μ may comprise a unit of time distance. Intuitively, a probability obtained from Relation (17) may decrease in proportion to a distance between $q_{time}$ and time(d), such that, for example, a document with a creation date closer to $q_{time}$ may receive a higher probability than a document having a creation date farther away from $q_{time}$.

TSU may be applied to measure a temporal similarity between query q and prediction p based at least in part on two assumptions. First, it may be assumed that prediction p is more likely to be relevant if its parent time $time(d^p)$ is closer to the time of query article $time(d^q)$. A first temporal feature, denoted $TSU_1$, may be calculated via a relation similar to that recited above in Relation (17) to generate the following Relation (18):

$$TSU_1(q, p) = DecayRate^{\lambda \frac{|time(d^q) - time(d^p)|}{\mu}} \quad (18)$$

A second assumption, denoted $TSU_2$, is that a prediction is more likely to be relevant if its future dates $p_{future}$ are closer to the publication date of query article $time(d^q)$. If there is more than one future dates associate with a prediction p, a final score may be averaged over scores of future dates $p_{future}$ in a particular implementation. A temporal distance of $TSU_2$ of query q and prediction p may defined as shown below in Relation (19):

$$TSU_2(q, p) = \frac{1}{N_f} \sum_{t_f \in p_{future}} DecayRate^{\lambda \frac{|time(d^q) - t_f|}{\mu}} \quad (19)$$

In Relation (19), $t_f$ may comprise a future date in $p_{future}$ and $N_f$ may comprise a number of all future dates.

In addition to TSU1 and TSU2, a temporal similarity between query q and prediction p may be based at least in part on a fuzzy set membership process or relation. A fuzzy set membership process may, for example, utilize a parent time $time(d^p)$ and a time of query article $time(d^q)$ in a particular implementation. A fuzzy set membership process may be denoted as $FS_1$, and may be computed as shown below in Relation (20):

$$FS_1(q, p) = \begin{cases} 0 & \text{if } time(d^p) < \alpha_1 \lor time(d^p) > time(d^q), \\ f_1(time(d^p)) & \text{if } time(d^p) \geq \alpha_1 \land time(d^p) < time(d^q), \\ 1 & \text{if } time(d^p) = time(d^q). \end{cases} \quad (20)$$

In Relation (20), $f_1(time(d^p))$ is equal to $$\left(\frac{time(d^p) - \alpha_1}{time(d^q) - \alpha_1}\right)^n$$

if $time(d^p) \neq time(d^q)$, or "1" if $time(d^p) = time(d^q)$.

A second temporal feature based on a fuzzy set may be defined based at least in part on a prediction's future dates $p_{future}$ and a publication date of query article $time(d^q)$. Similarly, if a prediction p has more than one future date, a final score may be averaged over scores of dates $p_{future}$. A second temporal feature $FS_2$ may be defined as follows in Relation (21):

$$FS_2(q, p) = \frac{1}{N_f} \sum_{t_f \in p_{future}} \begin{cases} 0 & \text{if } t_f < time(d^q) \lor t_f > \alpha_2, \\ 1 & \text{if } t_f = time(d^q), \\ f_2(t_f) & \text{if } t_f > time(d^q) \land t_f \leq \alpha_2. \end{cases} \quad (21)$$

$N_f$ may comprise a number of future dates in $p_{future}$. $t_f$ may comprise a future date such that, for example, $t_f \in p_{future}$. $f_2(t_f)$ is equal to $$\left(\frac{\alpha_2 - t_f}{\alpha_2 - time(d^q)}\right)^m$$

if $t_f \neq time(d^q)$, or "1" if $t_f = time(d^q)$. n and m may comprise constants. $\alpha_1$ and $\alpha_2$ may comprise a minimum and a maximum time of reference with respect to $q_{time}$. In a particular implementation, $\alpha_1$ may be calculated by subtracting a time offset $s_{min}$ from $q_{time}$ and $\alpha_2$ may be calculated by adding offset $s_{max}$ to $q_{time}$.

Given a query q, a prediction p may be ranked based at least in part on a ranking model obtained by training over a set of labeled query/prediction pairs using a learning algorithm in a particular implementation. An unseen query/prediction pair (q, p) may be ranked according to a weighted sum of feature scores as shown below in Relation (22):

$$\text{score}(q, p) = \sum_{i=1}^{N} w_i \times x_i \quad (22)$$

In Relation (22), $x_i$ may comprise different features extracted from prediction p and query q. N may comprise a number of features and $w_i$ may comprise weighting coefficients. A goal of Relation (22) may be to learn weights $w_i$ using a training set of queries and predictions, in order to minimize a given loss function. Learning to rank relations may be categorized into different approaches, such as pointwise, pairwise, or listwise approaches.

A "pointwise" approach, as used herein, may refer to an approach to predict a relevance judgment for a document while ignoring positions of other documents in a ranked list. A pointwise approach may be based at least partially on an assumption that retrieved documents are independent.

A "pairwise" approach, as used herein, may refer to an approach to predict a relevance judgment for a pair of documents given as a relative order between the pair of documents. A relative order between a pair of documents may be referred to as a "pairwise preference."

A "listwise" approach, as used herein, may refer to an approach to predict a relevance judgment for a set of retrieved documents. For example, a listwise approach may predict relevance degrees among documents.

A listwise learning algorithm $SVM^{MAP}$ may be employed to train a classifier using a support vector machine (SVM), and may determine an order of retrieved documents to directly optimize a Mean Average Precision (MAP).

As discussed herein, future related information may be abundant in news stories. A task of ranking related future predictions may be implemented to improve user access to future related information by selecting predictions from a news archive that are most relevant to a given news article. An evaluation dataset with over 6000 relevance judgments may be used to measure research progress in this task to provide a learned ranking model incorporating several classes of features including term similarity, entity-based similarity, topic similarity, or temporal similarity to outperform a strong baseline system on this evaluation set. An in-depth analysis of a feature selection task may be performed to demonstrate that in a particular implementation, a combination of classes may significantly improve results as opposed to use of a single class.

Figure 5:
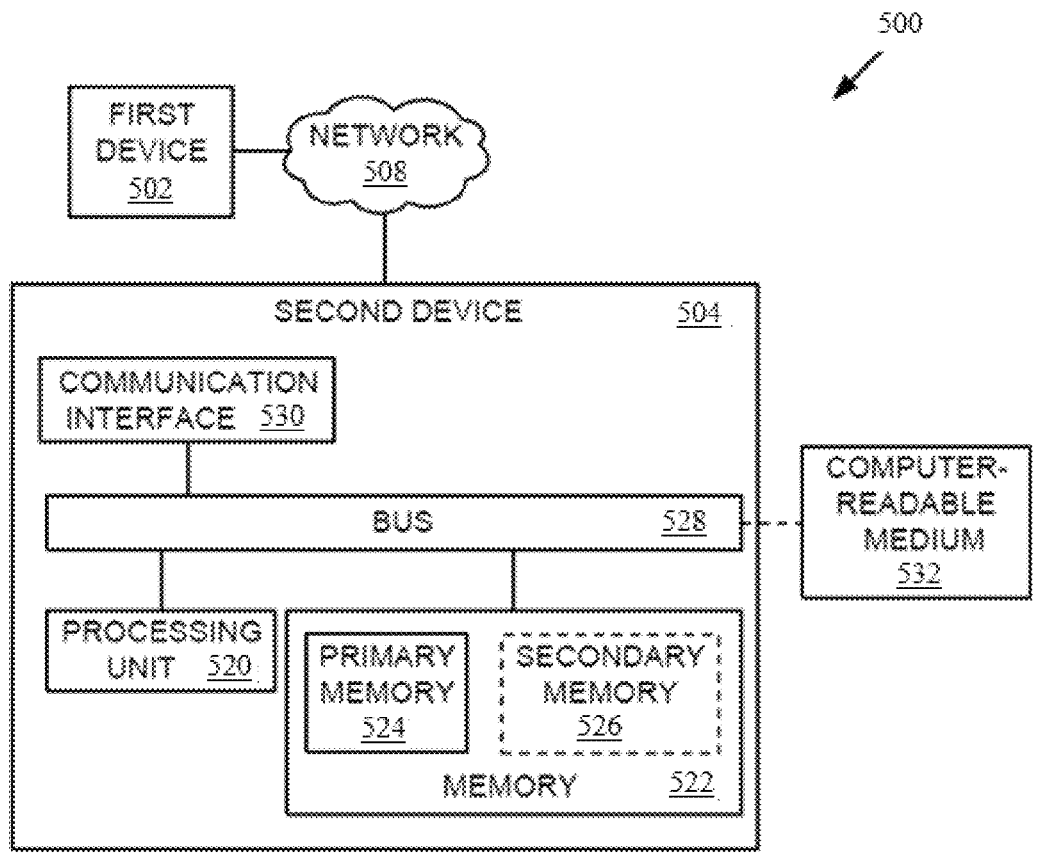
FIG. 5 is a schematic diagram illustrating a computing environment system that may include one or more devices to rank related news predictions.

FIG. 5 is a schematic diagram illustrating a computing environment system 500 that may include one or more devices to rank related news predictions. System 500 may include, for example, a first device 502 and a second device 504, which may be operatively coupled together through a network 508.

First device 502 and second device 504, as shown in FIG. 5, may be representative of any device, appliance or machine that may be configurable to exchange signals over network 508. First device 502 may be adapted to receive a user input signal from a program developer, for example. First device 502 may comprise a server capable of transmitting one or more quick links to second device 504. By way of example but not limitation, first device 502 or second device 504 may include: one or more computing devices or platforms, such as, e.g., a desktop computer, a laptop computer, a workstation, a server device, or the like; one or more personal computing or communication devices or appliances, such as, e.g., a personal digital assistant, mobile communication device, or the like; a computing system or associated service provider capability, such as, e.g., a database or storage service provider/system, a network service provider/system, an Internet or intranet service provider/system, a portal or search engine service provider/system, a wireless communication service provider/system; or any combination thereof.

Similarly, network 508, as shown in FIG. 5, is representative of one or more communication links, processes, or resources to support exchange of signals between first device 502 and second device 504. By way of example but not limitation, network 508 may include wireless or wired communication links, telephone or telecommunications systems, buses or channels, optical fibers, terrestrial or satellite resources, local area networks, wide area networks, intranets, the Internet, routers or switches, and the like, or any combination thereof.

It is recognized that all or part of the various devices and networks shown in system 500, and the processes and methods as further described herein, may be implemented using or otherwise include hardware, firmware, software, or any combination thereof (other than software per se).

Thus, by way of example but not limitation, second device 504 may include at least one processing unit 520 that is operatively coupled to a memory 522 through a bus 528.

Processing unit 520 is representative of one or more circuits to perform at least a portion of a computing procedure or process. By way of example but not limitation, processing unit 520 may include one or more processors, controllers, microprocessors, microcontrollers, application specific integrated circuits, digital signal processors, programmable logic devices, field programmable gate arrays, and the like, or any combination thereof.

Memory 522 is representative of any storage mechanism. Memory 522 may include, for example, a primary memory 524 or a secondary memory 526. Primary memory 524 may include, for example, a random access memory, read only memory, etc. While illustrated in this example as being separate from processing unit 520, it should be understood that all or part of primary memory 524 may be provided within or otherwise co-located/coupled with processing unit 520.

Secondary memory 526 may include, for example, the same or similar type of memory as primary memory or one or more storage devices or systems, such as, for example, a disk drive, an optical disc drive, a tape drive, a solid state memory drive, etc. In certain implementations, secondary memory 526 may be operatively receptive of, or otherwise able to couple to, a computer-readable medium 532. Computer-readable medium 532 may include, for example, any medium that can carry or make accessible data signals, code or instructions for one or more of the devices in system 500.

Second device 504 may include, for example, a communication interface 530 that provides for or otherwise supports operative coupling of second device 504 to at least network 508. By way of example but not limitation, communication interface 530 may include a network interface device or card, a modem, a router, a switch, a transceiver, or the like.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated.

It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

While certain exemplary techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all implementations falling within the scope of the appended claims, and equivalents thereof.

What is claimed is:

1. A method, comprising:
   executing machine-readable instructions by a special purpose computing apparatus, wherein the executing the instructions results in the following being performed:
   generating a query, by the special purpose computing apparatus, based, at least in part, on one or more features or characteristics of an electronic document at least partially in response to the electronic document being accessed by a user, wherein the generating the query comprises generating one or more digital signals comprising the query; and
   obtaining one or more digital signals comprising one or more predictions comprising one or more sentence portions having one or more references to one or more future dates based at least in part on a comparison of the one or more digital signals comprising the query with one or more digital signals comprising a prediction index, wherein the one or more digital signals comprising the one or more predictions are extracted from a temporal collection of documents comprising at least personal emails.

2. The method of claim 1, further comprising determining the one or more predictions is based at least in part on a relevance between the electronic document being accessed by the user and the one or more predictions.

3. The method of claim 2, wherein the relevance is based at least in part on a term similarity between the electronic document being accessed by the user and one or more terms of the one or more predictions.

4. The method of claim 2, wherein the relevance is based at least in part on a topic similarity between the electronic document being accessed by the user and one or more topics of the one or more predictions.

5. The method of claim 2, wherein the relevance is based at least in part on a temporal similarity between the electronic document being accessed by the user and the one or more predictions.

6. The method of claim 1, wherein at least one of the one or more future dates comprises an implicit temporal expression.

7. The method of claim 1, wherein the generated query comprises one or more keywords and a time of the generated query.

8. A system, comprising:
   a receiver to receive one or more signals;
   a processor to:
   generate a query to be based, at least in part, on one or more features or characteristics of an electronic document, and at least partially in response to receipt of the one or more signals to indicate an access of the electronic document by a user; and
   determine one or more predictions to comprise one or more sentence portions to have one or more references to one or more future dates to be based at least in part on a comparison of the query with a prediction index, wherein the one or more predictions are to be extracted from a temporal collection of documents to comprise at least personal emails.

9. The system of claim 8, further comprising a transmitter to transmit the one or more predictions to the user.

10. The system of claim 8, the processor to determine the one or more predictions to be based at least in part on a relevance between the electronic document to be accessed by the user and one or more topics of the one or more predictions.

11. The system of claim 8, the query to be generated to comprise one or more keywords and a time of the generated query.

12. An article, comprising:
    a non-transitory storage medium comprising machine-readable instructions to be executable by a special purpose apparatus to:
    generate a query to be based, at least in part, on one or more features or characteristics of an electronic document at least partially in response to an access of the electronic document by a user; and
    obtain one or more predictions to comprise one or more sentence portions to have one or more references to one or more future dates to be based at least in part on a comparison of the query with a prediction index, wherein the one or more predictions are to be extracted from a temporal collection of documents to comprise at least personal emails.

13. The article of claim 12, wherein the machine-readable instructions are to be further executable by the special purpose apparatus to determine the one or more predictions to be based at least in part on a relevance between the access of the electronic document by the user and the one or more predictions.

14. The article of claim 13, wherein the relevance is to be based at least in part on a term similarity between the access of the electronic document by the user and one or more terms of the one or more predictions.

15. The article of claim 13, wherein the relevance is to be based at least in part on a topic similarity between the electronic document to be accessed by the user and one or more topics of the one or more predictions.

16. The article of claim 13, wherein the relevance is to be based at least in part on a temporal similarity between the electronic document to be accessed by the user and the one or more predictions.

17. The article of claim 13, the query to be generated to comprise one or more keywords and a time of the query to be generated.

* * * * *